C. REESE.

Box.

No. 8,599. Reissued Feb. 25, 1879.

ATTEST;

Arthur C. Fraser.

Walter W. Scott

INVENTOR;

Charles Reese

Per Burke & Fraser

Attys

UNITED STATES PATENT OFFICE.

CHARLES REESE, OF BALTIMORE, MARYLAND.

IMPROVEMENT IN BOXES.

Specification forming part of Letters Patent No. 55,709, dated June 19, 1866; Reissue No. 8,599, dated February 25, 1879; application filed February 1, 1878.

*To all whom it may concern:*

Be it known that I, CHARLES REESE, of Baltimore, in the county of Baltimore, and State of Maryland, have invented certain Improvements in the Manufacture of Boxes or Receptacles for Fruit and other articles or substances, of which the following is a specification:

Heretofore boxes, baskets, and receptacles for fruit and other commodities have been of so costly a character that they could not well be given to the buyer along with the contents without materially affecting the profits, and in consequence they have been gathered or collected and sent back to be used over again. This involved freight or carriage of a bulky article, and, though cheaper than to furnish new receptacles, was an additional charge, and increased the cost of the commodity in market. Besides, many commodities, especially small fruits and berries, will not bear without injury transferring from the original receptacle to that of the buyer.

The object of this invention is to obviate the difficulties above mentioned by providing a box or receptacle made so cheaply that it may be given with the contents sold, and not required to be returned to the seller. I design to supply them at such a very small cost that they may be advantageously presented to the buyer of the contents, and, having served their purpose, that they may be then thrown away, and even then be a less charge upon the trade than the returnable receptacles heretofore in the market.

My invention consists in a box or receptacle made of a single piece of wood veneer or other similar material, bent up to form the sides and ends thereof, and having the surplus material at the corners made to overlap and re-enforce the adjacent sides or ends, which overlapping projections are secured to the contiguous sides or ends by eyelets or their equivalents, substantially as hereinafter specified.

Figure 1:
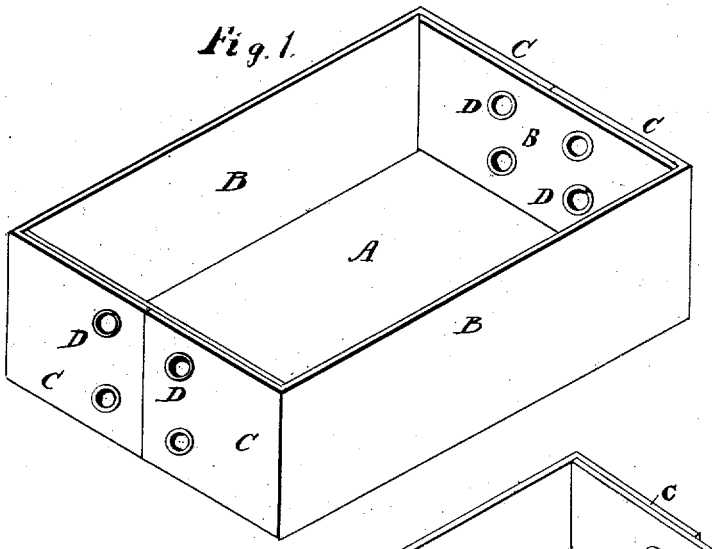
Figure 2:
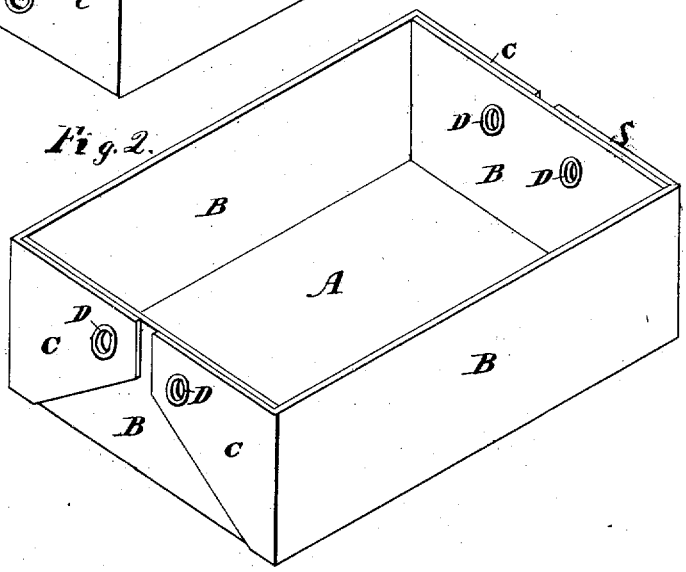

In the drawings is shown a box for fruit made according to my improved method, in which Figure 1 is a view, in perspective, of a fruit-box made according to my invention, and Fig. 2 is a view, in perspective, showing a modification of the construction.

A represents the bottom, and B B the sides or ends, bent up at a suitable angle with the bottom, but forming part of the same piece of the material. C C are flaps or projections parallel before being bent around the corners produced from the surplus material at the corners and prolonged from the sides or ends to which they adjoin. These projections are turned around the several corners of the box, and are caused to overlap and re-enforce the adjacent sides or ends, to which they are secured by eyelets D D, or their equivalents. In Fig. 1 these flaps or projections are represented as entirely covering the ends of the box, but in Fig. 2 the flaps or projections are shown as not entirely covering the ends of the box nor meeting at the middle thereof.

The box or receptacle is made of such size and shape as may be desired, and the material may vary with circumstances. It may be thin veneer of wood, paper, card-board, leather, or some fabric, and it may be made to assume the required proportions and shape, whether as a measure of capacity or as an ornamental form, for other uses besides the one which I have mentioned when it was assumed to be used but once and then discarded. It may be covered or lined, or both, with suitable material, ornamental or otherwise, colored or embossed, according to the required style, purpose, or cost.

There are a number of ways of cutting out a blank from a sheet or piece, so that, when folded up, certain flaps or projections shall overlap the adjacent ends or sides, and by attachment thereto form the means of holding the sides and ends together in their proper relative positions to one another and to the bottom. One mode is shown in the drawings where a rectangular piece, by four cuts, (and the removal of four corners, if desired, which is not, however, a necessity,) is prepared for folding up and securing by the eyelets, as shown. Many other forms will naturally suggest themselves to the mind of a mechanic, which it is needless to attempt to anticipate.

Having thus described my invention, what

I claim as new, and desire to secure by Letters Patent, is—

A box or receptacle made of a single piece of wood veneer or other similar material bent up to form the sides and ends thereof, and having surplus material at the corners, consisting of prolonged parallel projections made to overlap and re-enforce the adjacent sides or ends, and which projections are secured to said sides or ends by eyelets or their equivalents, substantially as described.

In witness whereof I have hereunto set my hand.

CHARLES REESE.

Witnesses:
JAS. M. BOWLING,
DOUGLAS WIER.